METHOD AND APPARATUS FOR READING THERMOPLASTIC RECORDINGS

Filed Sept. 14, 1964 2 Sheets-Sheet 1

INVENTORS
STEFAN A. OCHS
HAROLD BORKAN
BY
W.S. Hill
AGENT

METHOD AND APPARATUS FOR READING THERMOPLASTIC RECORDINGS

Filed Sept. 14, 1964 2 Sheets-Sheet 2

INVENTORS
STEFAN A. OCHS
HAROLD BORKAN
BY
W. S. Hill
AGENT

United States Patent Office 3,382,490

Patented May 7, 1968

3,382,490
METHOD AND APPARATUS FOR READING THERMOPLASTIC RECORDINGS

Harold Borkan and Stefan A. Ochs, Princeton, N.J., assignors to Radio Corporation of America, a corporation of Delaware Filed Sept. 14, 1964, Ser. No. 396,229
20 Claims. (Cl. 340—173)

This invention relates generally to the recovery of information contained on thermoplastic recording elements and more particularly relates to an improved method and apparatus for recovering the information stored on an electrophotographic thermoplastic recording element. The improved method and apparatus of the present invention are useful particularly, but not exclusively, for the playback of thermoplastic recordings of television signals.

Methods and apparatus are known for storing information by forming a relief pattern on a thermoplastic photoconductive layer of an electrophotographic recording element. The relief pattern is formed by first charging the layer electrostatically, exposing it to a light image to discharge it selectively and then heating the layer until softened. The electrostatic forces on the softener layer produce a deformation of the layer and a relief pattern, or ripple image, of the latent image thereon. The relief pattern is fixed by cooling the thermoplastic recording element.

Materials and techniques have been developed for making high-resolution thermoplastic relief patterns. Typical relief patterns consist of surface deformations having a maximum amplitude of less than $1\times10^{-4}$ cm. Such patterns are useful as potential means for the storage of television signals or computer information. There are other fields of application, such as fast-developing movie film and recording elements for industrial scientific work where high density patterns are needed. In all such applications a simple, satisfactory method for the readout of the recorded information is desirable.

It is an object of the present invention to provide an improved method and apparatus for recovering the information contained in recording elements in which the information is stored as relief patterns in a base material.

It is another object of this invention to provide a method and apparatus for the direct optical projection of information recorded in the form of relief patterns, using well known optical systems.

It is still another object of this invention to provide an improved method and apparatus for converting the information which is stored in a surface relief pattern on a base material into images having good intermediate gray scale rendition.

It is a particular object of this invention to provide a method and apparatus for the recovery of information stored as a relief pattern on a substantially transparent electrostatic recording element by the use of well known optical sensing devices, and with improved resolution and reduced distortion.

Further objects of the invention will be apparent from the reading of the present disclosure taken in conjunction with the drawings, in which.

Figures 1A, 1B, 1C, 2:
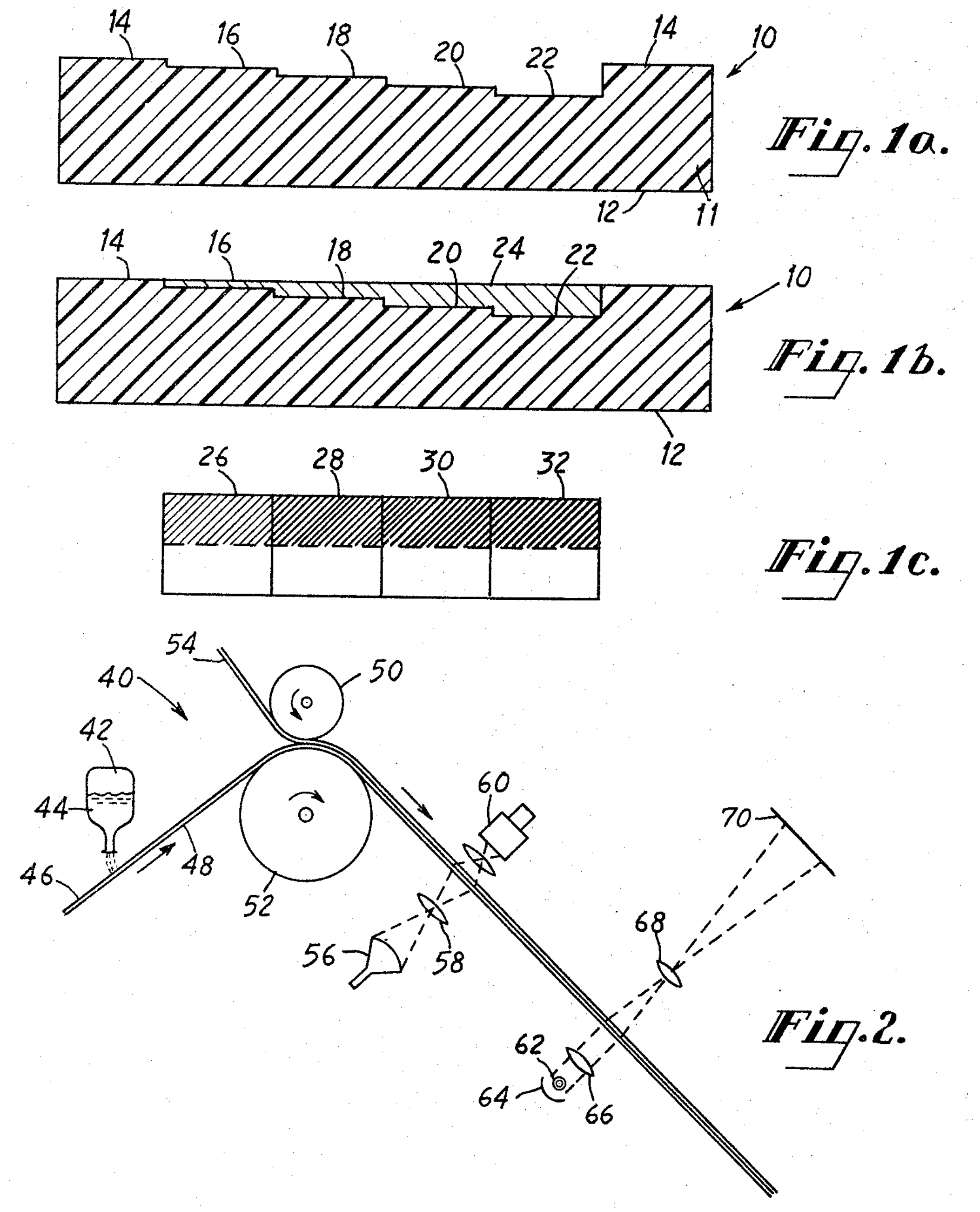
FIGURE 1A is a schematic sectional view through a thermoplastic recording element of the type useful in this invention.
FIGURE 1B is a schematic sectional view of the recording element of FIGURE 1A to which a light-absorbing material has been added.
FIGURE 1C is a schematic view of a reproduction of light transmitted through the recording element of FIGURE 1B.
FIGURE 2 is a schematic view of one embodiment of apparatus useful in the practice of this invention.

The objects of this invention may be accomplished by filling the relief pattern of a recording element with a light-absorbing material. The outer surface of the light-absorbing material is smoothed and preferably made substantially coincident with the position occupied by the information-containing surface prior to deformation. The thickness of the material at any point is a function of the depth of the relief patern at that point. A beam of light is passed through the light-absorbing material and is absorbed by the layer in proportion to its thickness. In a preferred embodiment, the recording element is prepared from light-transmitting materials, such as polystyrene, so that light absorption by the recording element is negligible. The transmitted light constitutes a readout of the information stored on the recording element. The regions of the greatest pattern depth on the recording element contain the most light-absorbing material and appear as the regions of least light intensity when detected. Similarly the regions of least depth on the recording element contain the least light-absorbing material and appear as the regions of greatest light intensity when detected. The other regions correspond to intermediate depth regions.

In embodiments where the base material is opaque or has such light-absorption characteristics as to interfere with the transmission of light through it, a thin reflective layer, preferably limited to a few molecules in thickness, is deposited on the relief pattern before the light-absorbing material is added. Readout is accomplished by passing light through the light-absorbing material onto the reflective layer where it is reflected back through the material to a detection device. The latter readout embodiment may be utilized where information is contained on both sides of a recording element.

The relationship between transmitted light ($I_t$) and incident light ($I_o$) may be expressed as $$I_t/I_o=10^{-Ecd}$$

$E$=the molar extinction coefficient cm.$^{-1}$(moles/liter)$^{-1}$,
$c$=concentration of light-absorbing material (moles/liter),
$d$=thickness (in cm.) of light-absorbing material layers (relief pattern depth range).

Table I gives the various ranges of groove depths, and corresponding approximate values of E$c$ which produce useful half-tone rendition.

TABLE I

| $d$ (cm.) | E$c$ (cm$^{-1}$) | E$cd$ |
|---|---|---|
| $10^{-6}$ to $10^{-5}$ | 2 to $4\times10^5$ | 0.2 to 4 |
| $10^{-5}$ to $10^{-4}$ | 2 to $4\times10^4$ | 0.2 to 4 |
| $10^{-4}$ to $10^{-3}$ | 2 to $4\times10^3$ | 0.2 to 4 |
| $10^{-3}$ to $10^{-2}$ | 2 to $4\times10^2$ | 0.2 to 4 |

Any substance which absorbs light such that the ratio of transmitted light to incident light is between $10^{-0.2}$ to $10^{-4}$ for the relief pattern depth range employed may be used in the practice of this invention.

The light-absorbing material may be an ink or dye in appropriate suspensions or solutions. Materials which are useful in the practice of this invention include azo dyes and anthraquinone dyes. Such dyes are preferably used in conjunction with light of a narrow bandwidth, in the region of maximum absorption, by means of a narrow-band filter, such as an interference-type filter, or a narrow-band source, such as a flying spot scanner with a suitable kinescope phosphor.

Where a medium having a value for $Ec$ of $3\times10^4$ per centimeter is used the fractions of incident light transmitted by various thickness of the medium will be as follows:

TABLE II

| Relief pattern layer thickness, cm.: | Percent of incident light transmitted |
|---|---|
| $1\times10^{-5}$ | 50 |
| $2\times10^{-5}$ | 25 |
| $4\times10^{-5}$ | 6.3 |
| $6\times10^{-5}$ | 1.6 |
| $8\times10^{-5}$ | 0.4 |
| $1\times10^{-4}$ | 0.1 |

As indicated by the foregoing table, a practical range of intermediate tones in the gray scale is produced by the transmitted light.

Turning now to the drawings, the relief pattern present in a thermoplastic recording element is shown schematically in FIGURE 1A. The thermoplastic recording element 10 comprised of a substantially transparent material 11 has a lower surface 12 and an irregular upper surface 14 which contains a number of depressions 16, 18, 20 and 22 which are characteristic of such recording elements.

FIGURE 1B shows the same recording element to which a light-absorbing material 24 has been applied. The material 24 has filled the depressions to the original level of the upper surface 14. When light is projected through the material 24, a range of intermediate tones is produced as shown in FIGURE 1C. The shallowest depression 16 contains the least light-absorbing material 24, absorbs the least amount of light and produces the lightest pattern 26. A slightly deeper depression 18 contains more light-absorbing material, absorbs more light and produces a slightly darker pattern 28. The next deeper depression 20 contains even more light-absorbing material, thus absorbing more light and producing a still darker pattern 30. The deepest depression 22 contains the greatest depth of light-absorbing material, and therefore absorbs the most light, producing the darkest pattern 32.

The deformation pattern can be of any desired width on the film, corresponding to motion picture frames, for example.

The light-absorbing material may be applied in many different ways, such as by spraying, brushing, pouring, dipping, rolling, etc. One technique is shown schematically in FIGURE 2. In that figure an entire apparatus 40 is shown schematically for applying light-absorbing material and reading out the information contained on a transparent recording element. Vessel 42 contains light-absorbing material 44 which is applied uniformly to the relief pattern-containing side 46 of a recording element 48. The recording element with the material 44 on it passes between two rotating rolls 50, 52 which serve to remove excess material and level the material substantially with the original outer surface of the recording element.

It has been found desirable in some cases to apply a thin transparent solid material 54, such as clear polyethylene terephthalate, by feeding the material 54 through the rolls concurrently with the recording element 48 containing the light-absorbing material 44. The pressure of the rolls, and probably the triboelectric effect, serve to level the material 54 and make it adhere to the recording element 48, thereby producing a substantially exact leveling of the light-absorbing material on the relief pattern side 46 of the recording element 48.

The readout may be accomplished by use of a flying spot scanner 56 which projects light through an optical system 58 onto a photocell 60. The spot is scanned across the width of the recording element as in a television raster. The recording element passes across the optical system 58 and reduces the intensity of light reaching the photocell 60. The pattern of light intensity reaching the photocell constitutes a readout of the information contained on the recording element 48.

An alternate embodiment of a readout system for use with transparent recording elements is also shown in FIGURE 2. A high intensity light source 62, such as a movie projection lamp, is directed by a reflector 64 through an optical train 66, including a projection lens 68, onto a projection screen 70. The recording element 48 passes across the optical train and reduces the intensity of light reaching the screen 70. The image appearing on the projection screen is a readout of the information contained on the recording element. For some purposes it is advantageous that a face plate of a television camera (image orthicon or other type of camera tube) be substituted for the projection screen 70. The readout of information stored on the recording element 48 may be obtained by the same techniques as used for movie film. For instance, television signals may be produced by projection of light onto an image orthicon, or by the use of the flying spot scanner and a photocell with well-known associated equipment.

Figure 3:
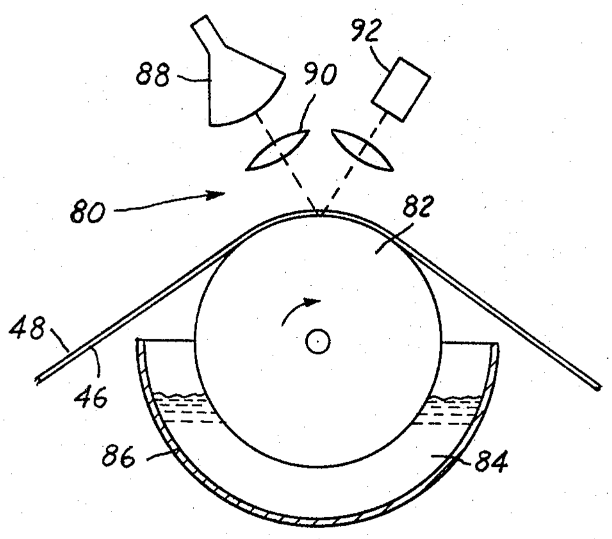
FIGURE 3 is a schematic view of another embodiment of apparatus useful in the practice of this invention.

FIGURE 3 shows another embodiment for applying the readout technique of the present invention, where the recording element is transparent. The apparatus 80 of FIGURE 3 utilizes a cylinder 82 with a highly polished mirror finish. The cylinder 82 rotates through a bath of light-absorbing material 84 contained in a vessel 86 and picks up a thin film of the material 84 which adheres to its surface. The relief pattern-containing side 46 of the recording element 48 passes around the cylinder 82 for at least a portion of its periphery. The thin film of light-absorbing material is pressed into the relief pattern on side 46. Excess material is excluded due to the pressure of the recording element 48 against the surface of the rotating cylinder 82. The readout may be accomplished by means of a flying spot scanner 88 which projects light through an optical train 90 and through the light-absorbing material contained on the recording element 48 onto the surface of the cylinder 82 which reflects it through the light-absorbing material onto a photocell 92.

As the cylinder rotates and the recording element moves forward, the light spot scans its surface. The light penetrates and passes through the light-absorbing material twice and is modulated in accordance with the thickness of the material. The pattern of the intensity of the light reaching the photocell constitutes a readout of the information contained on the recording element.

It is a feature of the latter embodiment that light-absorbing materials which do not wet the surface of the thermoplastic tape may be trapped between the cylinder and the tape. None of the material adheres to the thermoplastic recording element 48 when the latter leaves the cylinder 82 but adheres to the cylinder 82. The material may be recycled and used continuously reducing the need for replenishment.

Figure 4:
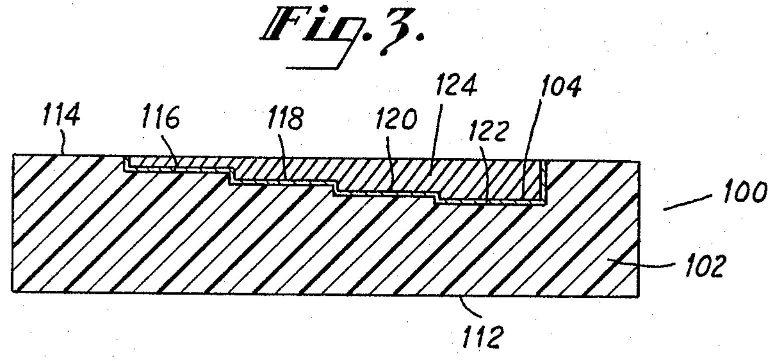
FIGURE 4 is a schematic sectional view through a substantially opaque recording element adapted for use with the present invention.
Figure 5:
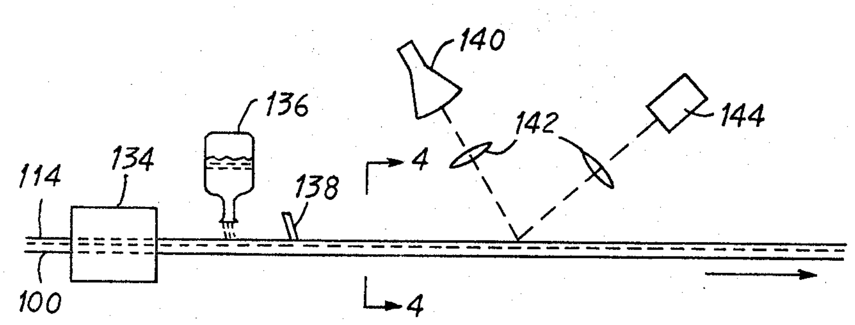
FIGURE 5 is a schematic view of an embodiment of the present invention for use with substantially opaque recording elements.

An apparatus for the readout of a recording element which is substantially opaque is shown in FIGURES 4 and 5. FIGURE 4 illustrates a recording element 100 comprised of a substantially opaque material 102 which has a lower surface 112 and an irregular upper surface 114 which contains a number of depressions 116, 118, 120 and 122, similar to those described above with regard to FIGURES 1A and 1B. A layer 104 of reflective material, such as aluminum or silver, is applied over the depressions. A light-absorbing material 124 is filled into the depressions of the relief pattern up to the original level of the upper surface 114. When light is projected through the light-absorbing material 124, it is reflected from the reflective layer 104 back through the material 124. The reflected light may be detected and constitutes a readout of the information contained on the recording element.

Apparatus for utilizing the recording element of FIGURE 4 is shown in FIGURE 5. There, a recording element 100 having a relief pattern-containing side 114 is passed through a metalizing apparatus 134, which may be a vacuum chamber in which aluminum is evaporated, etc., where a thin reflective coating is applied. A layer of light-absorbing material is applied from vessel 136 and leveled to a predetermined height by blade 138 which limits the surface height to that of the recording element before application of the information. The recording element at this point conforms to that shown in FIGURE 4. The readout may be accomplished by means of a flying spot scanner 140 which projects light through an optical train 142, and through the light-absorbing material 124 contained on the recording element 100. The light is reflected from the reflecting layer 104 onto a photocell 144. The pattern of the intensity of the light reaching the photocell constitutes a readout of the information contained on the recording element.

The resolution of recording elements, that is, the minimum width of a groove, is about $1 \times 10^{-3}$ cm. If readout is by means of an imaged light spot scanning the relief pattern, such a "flying spot" may readily be made fine enough to resolve all its detail. The speed with which such a light spot can read out the pattern is then limited by the electronic circuitry of the flying spot scanner, the persistence of the kinescope phosphor, and the bandwidth of the detector circuit. It should be possible to read at least $5 \times 10^6$ line pairs per second, which corresponds to a readout frequency of 5 megacycles per second.

The terms and expressions which have been employed herein are used as terms of description and not of limitation, and there is no intention in the use of such terms and expressions of excluding any equivalents of the features shown and described or portions thereof. Various modifications are possible within the scope of the invention claimed.

What is claimed is:

1. Apparatus for the production by optical means of images of an information-containing relief pattern on a recording element comprising a source of light disposed in optical alignment with the recording element to be read out, means for depositing light-absorbing material in said relief pattern, and detection means disposed in optical alignment with said source and said light-absorbing material to detect the intensity of light transmitted through said light-absorbing material, whereby the intensity of light detected at any discrete point is a function of the depth of the relief pattern at that point and the intensity of light detected at all discrete points constitutes a readout of the element.

2. Apparatus for the production by optical means of images of an information-containing relief pattern on a recording element comprising means to apply light-absorbing material to the information-containing side of the recording element, means to limit the thickness of the light-absorbing material and the recording element to a predetermined maximum related to the thickness of the recording element prior to the application of the information to it, a source of light arranged in optical alignment with said light-absorbing material, and means to detect the intensity of the light after transmission through said light-absorbing material, whereby the pattern of intensity of the transmitted light is a readout of the information contained on the recording element.

3. Apparatus for the production by optical means of images of an information-containing relief pattern on a transparent recording element comprising means for applying light-absorbing material to the information-containing side of the transparent recording element, means to smooth the surface of the applied light-absorbing material and limit the overall thickness of the recording element plus the light-absorbing material to a predetermined maximum, a source disposed to transmit light through said light-absorbing material and said recording element, and means to detect the transmitted light, whereby the detected light is a readout of the information contained on the recording element.

4. Apparatus for the production by optical means of images of an information-containing relief pattern on a transparent recording element comprising means for applying a light-absorbing material to the information-containing portion of the transparent recording element, means to apply a relatively thin transparent solid material over said light-absorbing material, whereby the surface of the light-absorbing material is smoothed to a substantially planar configuration, pressure rolls to compress the assembly of recording element, light-absorbing material and transparent solid material to a predetermined thickness related to the thickness of the recording element before the application of the information, a light source arranged to project light through said recording element, light-absorbing material and transparent solid material, and means to detect the transmitted light, said transmitted light being a readout of the information contained on the recording element.

5. Apparatus for the continuous production by optical means of images of an information-containing relief pattern on thermoplastic recording elements comprising means for applying light-absorbing material to the information-containing portion of a thermoplastic recording element, means to smooth the outer surface of said light-absorbing material to a substantially planar configuration, a projection screen, means to project light through said light-absorbing material onto said projection screen, and means to move said recording element between said light source and said screen at high speed, whereby the pattern of light projected onto said screen constitutes a readout of the information contained on the recording element.

6. Apparatus for the continuous, high speed production by optical means of images of an information-containing relief pattern on a thermoplastic recording element comprising means for applying a light-absorbing material to the information-containing portion of a thermoplastic recording element, means to smooth the outer surface of said light-absorbing material to a substantially planar configuration, a flying spot scanner for projecting light through said light-absorbing material, a photocell to detect the light transmitted through said light-absorbing material, and means to move said recording element between said scanner and said photocell at high speed, whereby the light detected by said photocell is a readout of the information contained on the thermoplastic recording element.

7. Apparatus for the continuous, high speed production by optical means of images of an information-containing relief pattern on a thermoplastic recording element comprising means for applying a light-absorbing material to the information-containing portion of a thermoplastic recording element, means to smooth the outer surface of said light-absorbing material, a camera tube, means to project light through said light-absorbing material onto said camera tube and means to continuously move said recording element between said projector means and said camera tube, whereby the information projected onto said camera tube constitutes a readout of the information contained on said thermoplastic recording element.

8. Apparatus for the production by optical means of images of an information-containing relief pattern on a thermoplastic recording element comprising a rotating cylinder disposed so that the thermoplastic recording element passes over at least a portion of the surface of said cylinder with the information-containing side of the recording element disposed toward said cylinder; a vessel containing light-absorbing liquid disposed so that the rotating cylinder passes through said light-absorbing liquid through at least a portion of its rotation, whereby the light-absorbing liquid adheres to the surface of said cylinder and is brought into contact with the information-containing side of the thermoplastic recording element filling the relief pattern of the recording element with said light-absorbing liquid; a source arranged to pass light through said light-absorbing liquid so as to be reflected from the surface of said cylinder; and detection means to detect the light reflected from said cylinder, whereby the detected light constitutes a readout of the information contained on the recording element.

9. Apparatus as defined in claim 8 wherein said detection means is a projection screen.

10. Apparatus as defined in claim 8 wherein said detection means is an image orthicon.

11. Apparatus as described in claim 8 wherein said source of light is a flying spot scanner and said detection means is a photocell.

12. Apparatus for the production by optical means of images of an information-containing relief pattern on a substantially opaque recording element comprising means to apply a thin layer of reflecting material to the information-containing side of said recording element, means to apply light-absorbing material to the information-containing side of said recording element, a source to transmit light through said light-absorbing material onto said reflecting material where it is reflected through said light-absorbing material, and means to detect said transmitted light whereby the detected light is a readout of the information contained on said recording element.

13. Apparatus as defined in claim 12 further comprising means to limit the outer surface of said light-absorbing material before light is transmitted through said material.

14. A method for the production by optical means of images of an information-containing relief pattern on a recording element comprising depositing a light-absorbing material in the depressions of the thermoplastic recording element, projecting light through said light-absorbing material, and detecting the transmitted light, whereby the intensity of the light detected at any discrete point is proportional to the depth of the relief pattern at that point and the intensity of light at all discrete points constitutes a readout of the information contained on said recording element.

15. A method as in claim 14 wherein the ratio of transmitted light to light from the source is between about $10^{-0.2}$ to $10^{-4}$.

16. A method for the production by optical means of images of an information-containing relief pattern on a recording element comprising applying a light-absorbing material to the information-containing side of the recording element, smoothing the external surface of the light-absorbing material, projecting light through said light-absorbing material, and detecting the transmitted light, whereby the pattern of intensity of the light detected is a readout of the information contained on the recording element.

17. A method for the production by optical means of images of an information-containing relief pattern on a recording element comprising applying a light-absorbing material to the information-containing side of the recording element, applying a thin transparent solid material to the external surface of said light-absorbing material, applying pressure to the assembly of said recording element, said light-absorbing material and said transparent solid material, whereby the surface of said light-absorbing material is reduced to a predetermined level related to the original surface of said recording element, projecting light through said light-absorbing material, and detecting the transmitted light, whereby the pattern of the intensity of the light detected is a readout of the information contained on the recording element.

18. A method for the production by optical means of images of an information-containing relief pattern on a transparent recording element comprising rotating a cylinder through a bath of liquid light-absorbing material, whereby the surface of the cylinder is coated with a thin film of the material, contacting the liquid-containing surface of said cylinder with the information-containing portion of the recording element, whereby the light-absorbing material fills the relief pattern of said element and excess liquid light-absorbing material is excluded; transmitting light from a source through the light-absorbing material whereby it is reflected from the surface of said cylinder, and detecting the transmitted light whereby the pattern of the intensity of the detected light constitutes a readout of the information contained on the recording element.

19. A method for the production by optical means of images of an information-containing relief pattern on an opaque recording element comprising applying a layer of reflecting material to the information-containing side of said recording element, filling the relief pattern with a light-absorbing material, transmitting light through said light-absorbing material so that it is reflected from said reflective layer, and detecting the transmitted light whereby the detected light is a readout of the information contained on said recording element.

20. A method as defined in claim 19 further comprising the step of leveling the external surface of said light-absorbing material prior to transmitting light through it.

References Cited

UNITED STATES PATENTS 3,196,013 7/1965 Walkup ------------ 340—173

TERRELL W. FEARS, *Primary Examiner.*